March 31, 1936.　　K. H. HUBBARD　　2,035,602
ELECTRICAL CONTROLLING SYSTEM
Filed May 29, 1935　　5 Sheets-Sheet 1
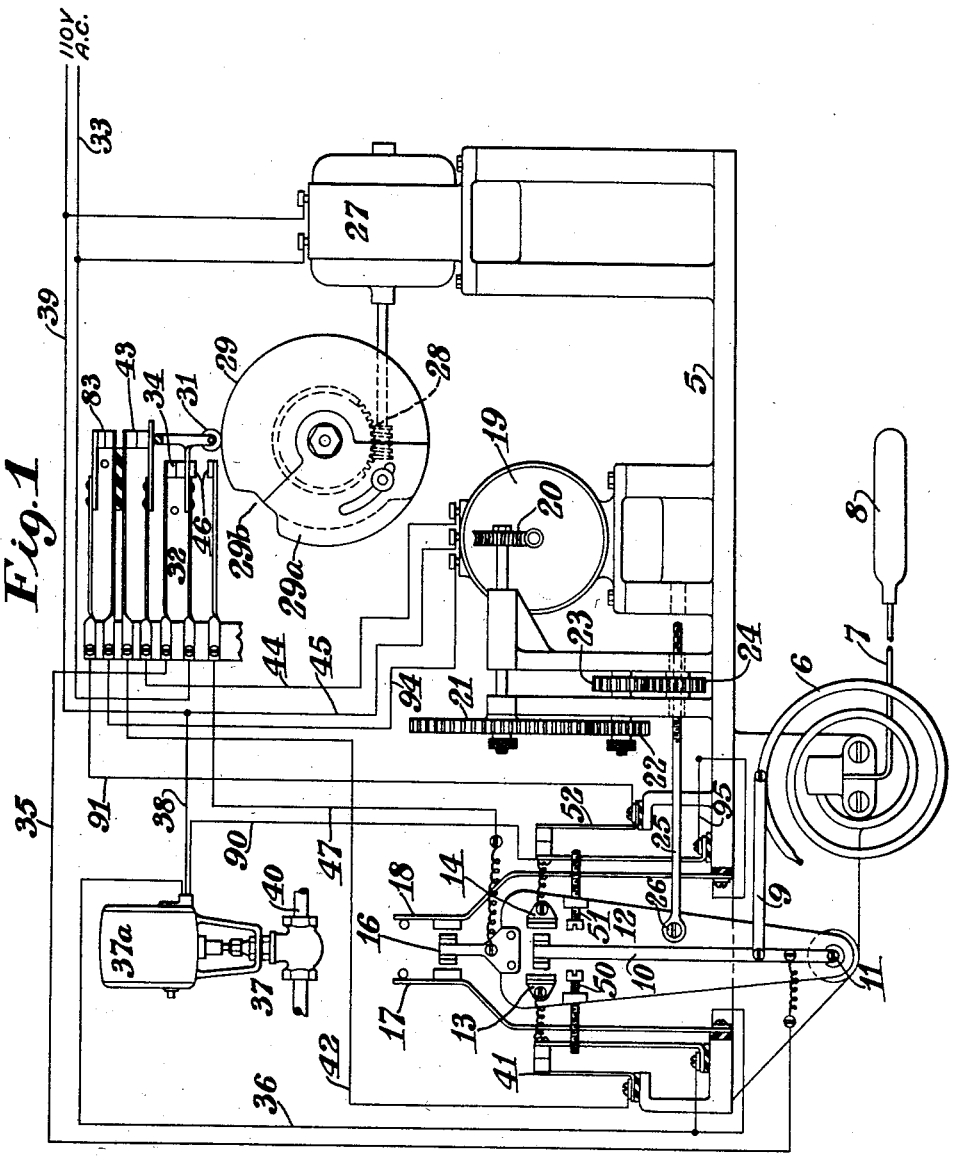
INVENTOR
Karl H. Hubbard
BY
D. Clyde Jones
ATTORNEY

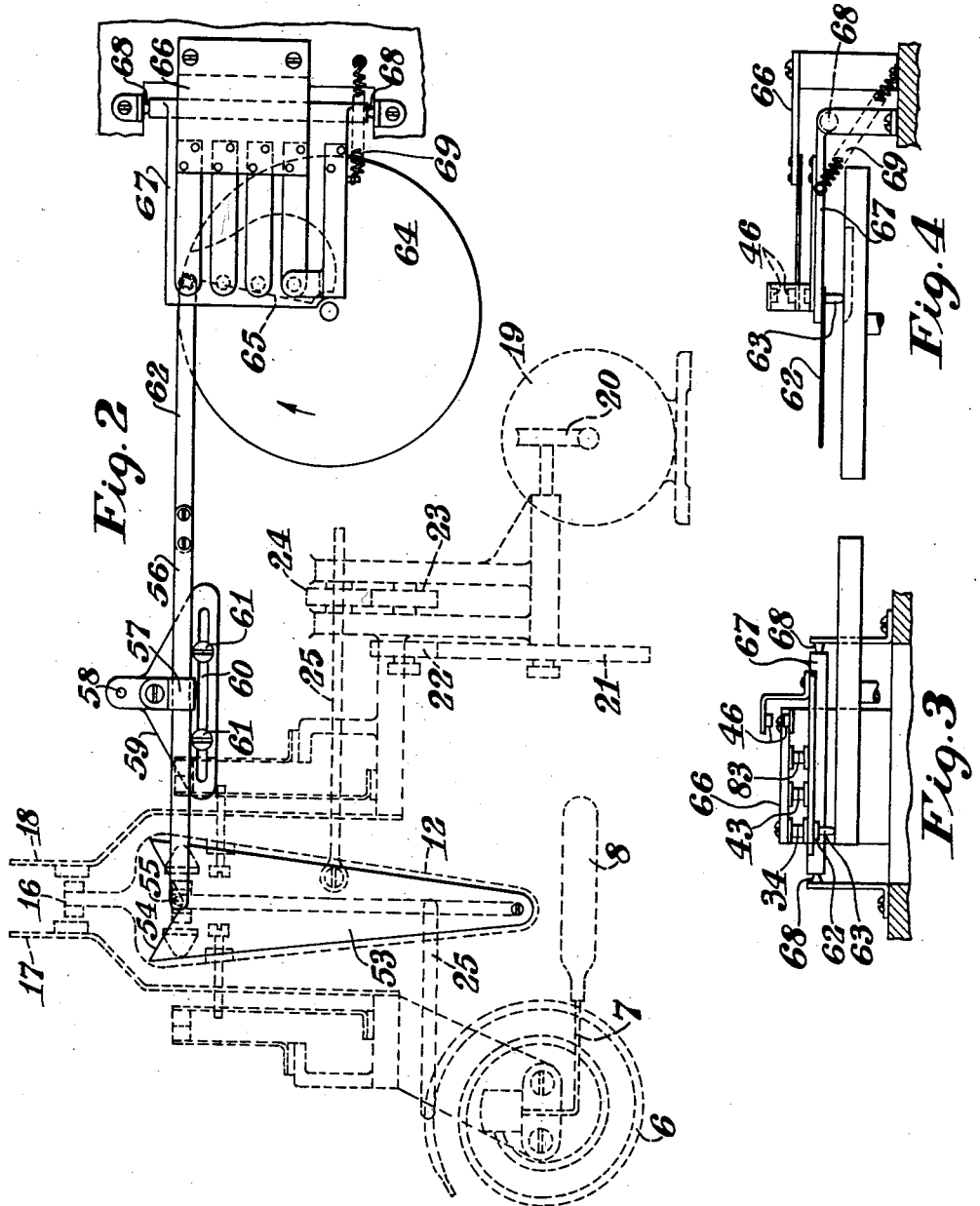

March 31, 1936.                K. H. HUBBARD                2,035,602
                        ELECTRICAL CONTROLLING SYSTEM
                        Filed May 29, 1935          5 Sheets-Sheet 3

INVENTOR
Karl H. Hubbard
BY
D. Clyde Jones
ATTORNEY

March 31, 1936.                K. H. HUBBARD                 2,035,602
                       ELECTRICAL CONTROLLING SYSTEM
                          Filed May 29, 1935        5 Sheets-Sheet 4

INVENTOR
*Karl H. Hubbard*
BY
*D. Clyde Jones*
ATTORNEY

March 31, 1936.  K. H. HUBBARD  2,035,602
ELECTRICAL CONTROLLING SYSTEM
Filed May 29, 1935  5 Sheets-Sheet 5

INVENTOR
Karl H. Hubbard
BY D. Clyde Jones
ATTORNEY

Patented Mar. 31, 1936

2,035,602

UNITED STATES PATENT OFFICE 2,035,602

ELECTRICAL CONTROLLING SYSTEM

Karl H. Hubbard, Rochester, N. Y., assignor to Taylor Instrument Companies, Rochester, N. Y., a corporation of New York Application May 29, 1935, Serial No. 23,972

10 Claims. (Cl. 236—74)

This invention relates to regulating systems and more particularly to electrically-operated regulating systems.

In my Patent No. 1,985,829, granted December 25, 1934, a pressure fluid operated regulating system is provided in which the regulation is effected jointly, by prompt response of low sensitivity and by a delayed response of high sensitivity responsive to a change in condition to be regulated. Such an arrangement is particularly satisfactory in effecting accurate operation of a regulating system even under adverse conditions. However, a supply of compressed air for motive power is required in that system but is not always available and so in accordance with the present invention, a novel arrangement is provided in which regulation similar to that accomplished in the mentioned system, is effected solely by combined electrical and mechanical means.

The main feature of the invention relates to a control system in which the regulating instrument promptly effects a controlling action to reestablish approximately the desired controlled condition and then slowly brings the controlled condition to the exact desired control point without "overthrowing", unless the instrument is purposely adjusted to "overthrow" slightly in order to reach the desired control point as quickly as possible.

An additional feature of the invention relates to a novel regulating arrangement which avoids the necessity of an air supply and yet effects accurate regulation without introducing a "hunting" action while still effecting complete correction for load changes.

Still a further feature of the invention resides in a regulating system which is simple in construction, reliable in operation, which is comparatively inexpensive to manufacture and install, and which requires a minimum amount of maintenance.

Figure 5:
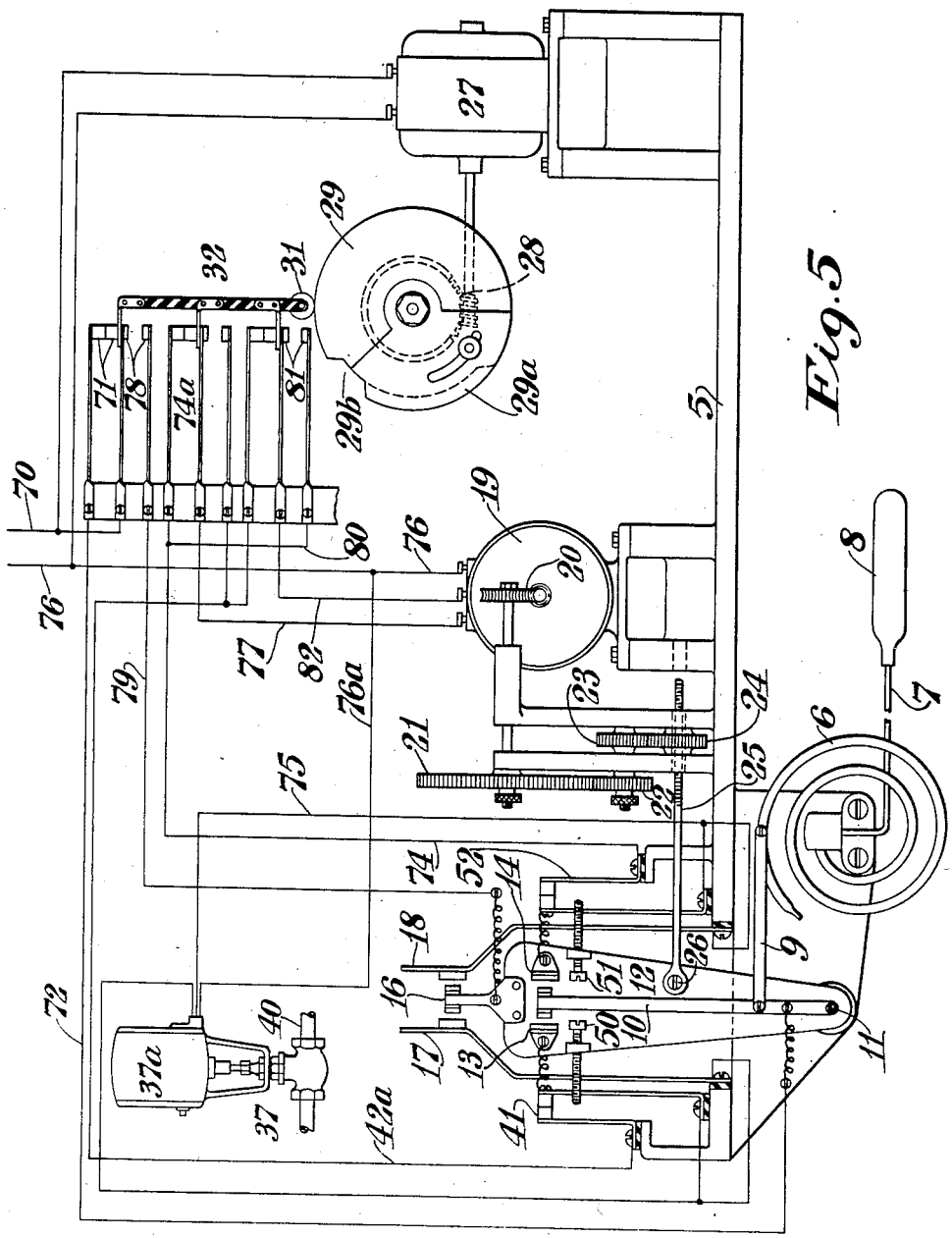
Figure 6:
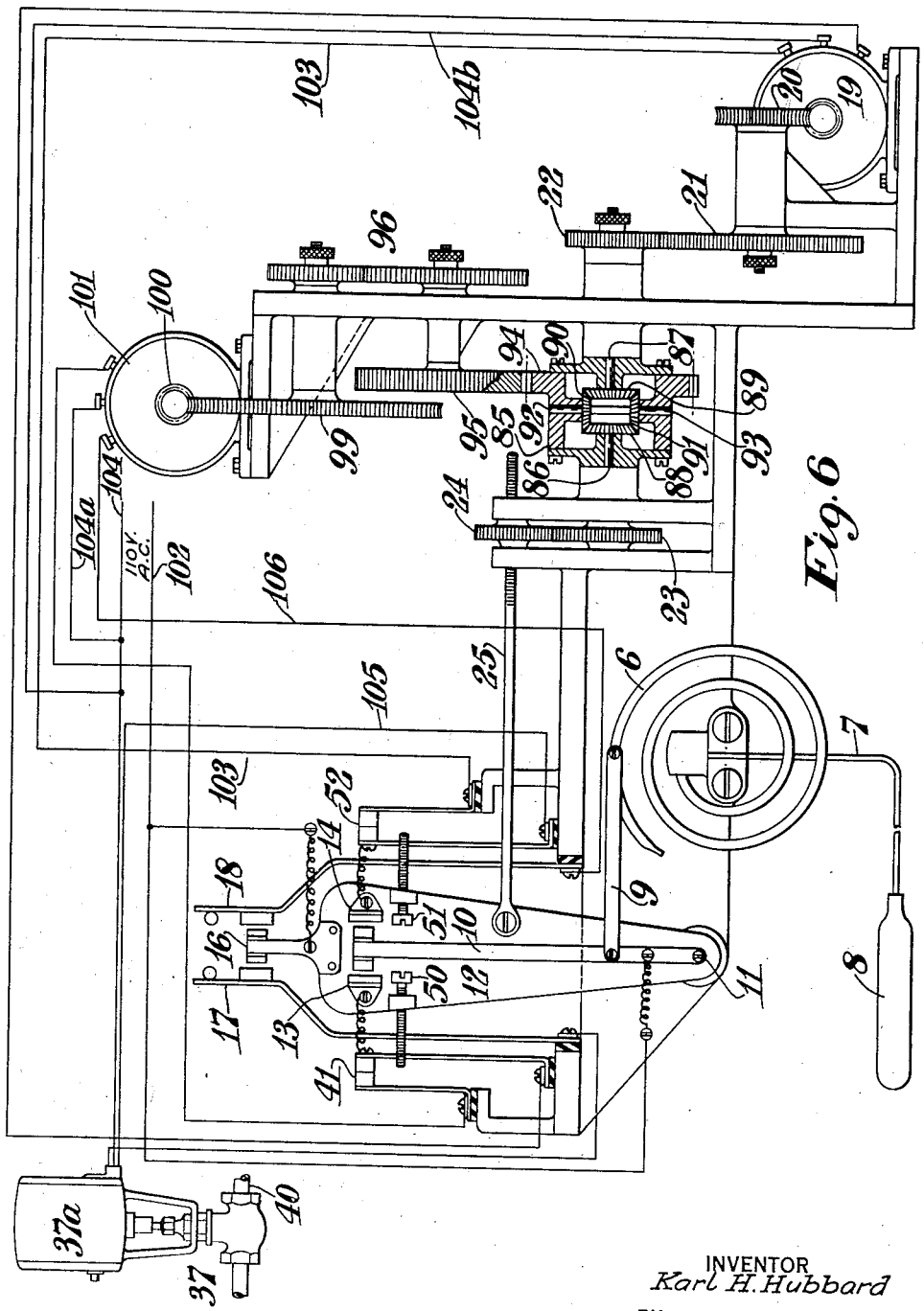
Figure 7:
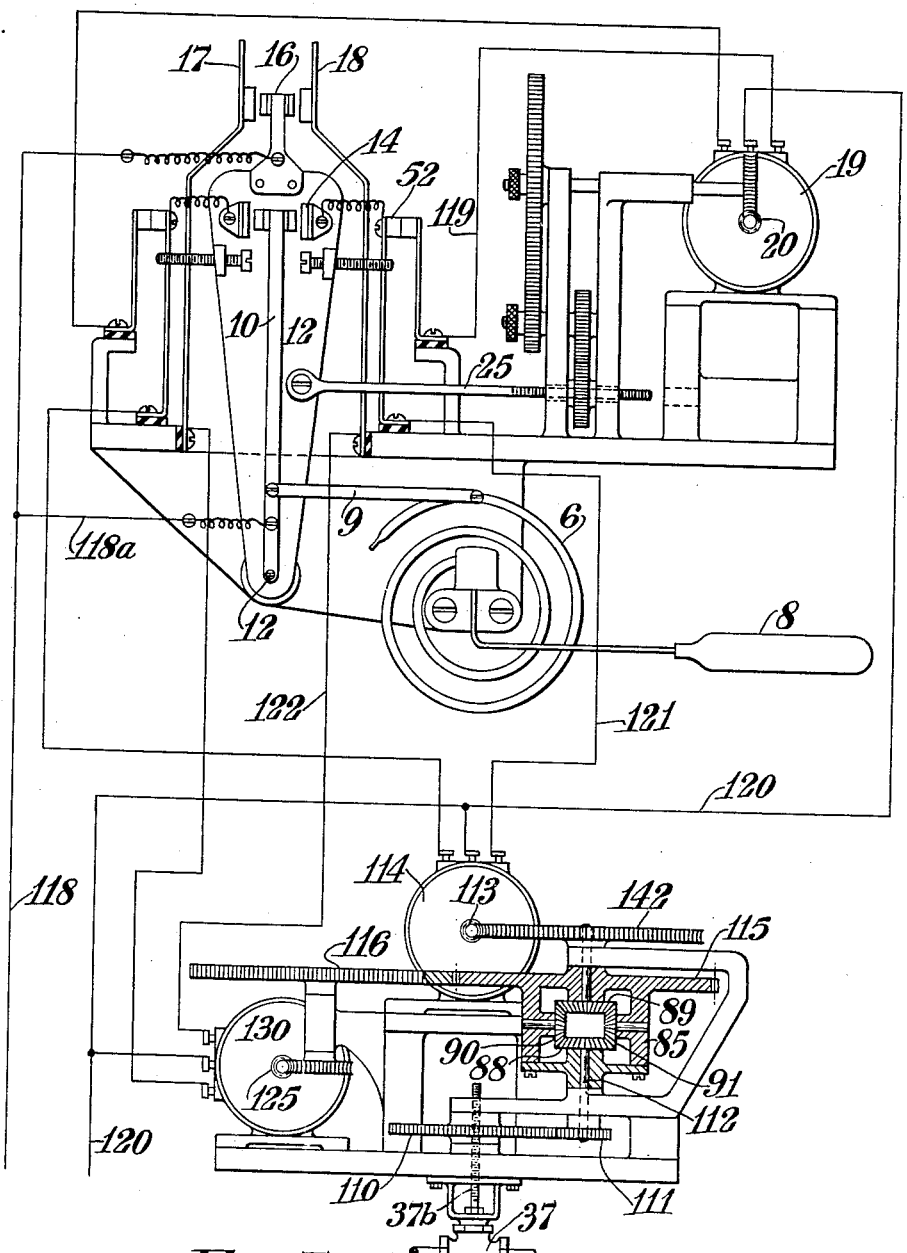

The various features of the invention will appear from the detailed description and claims when taken with the drawings in which Fig. 1 diagrammatically represents a regulating system in which the valve to be regulated and the mechanical structure of the regulating unit are shown in front elevation; Fig. 2 indicates certain structure by which the regulating unit of Fig. 1 can be changed to modify the operation of the same; Figs. 3 and 4 are different views of the intermittently actuated contact spring assembly and the cam for operating this assembly; Fig. 5 represents a modified form of the invention in which the second response is effected by slight additional movements of the support 12 in a direction opposite to the deviation with resulting additional valve movements as the support is returned to its former position; Fig. 6 represents a further modified form of the invention which obviates the need of the timing cams and the cooperating spring contact assembly of the above-mentioned arrangements, but instead a second motor and a differential gear drive are employed in cooperation with the motor 19 to drive the support 12; and Fig. 7 represents an additional modified form of the invention similar to that disclosed in Fig. 6, except that the second mentioned motor and the differential gear drive instead of cooperating with the motor which drives the support, cooperate with the motor which drives the valve.

Referring to Fig. 1, 5 designates the frame of a regulating unit supporting the fixed end of a Bourdon coil 6. As is well-known, this coil communicates through a capillary tube 7 with a bulb 8 which is responsive to the condition to be regulated. The coil, tube and bulb constitute a system which may be either mercury or vapor-actuated. The free end of the Bourdon coil 6 is connected by a link 9 to a movable contactor 10 herein illustrated as pivoted at 11 on the frame, while a terminal support 12 of insulating material, likewise pivoted at 11, carries contacts 13 and 14 in position to be engaged by the contactor 10. The upper end of this terminal support is provided with the contactor 16 which may be brought by a movement of the support 12 into engagement with the contact springs 17 or 18 insulatedly mounted on the frame, to control operating circuits to be hereinafter described. The frame 5 also supports a reversible motor 19 operating through the worm gear 20 and the reduction gears 21, 22 and 23, to drive the pinion 24. This pinion is mounted in a manner to prevent lateral movement thereof but makes threaded engagement with one end of the connecting link 25, while the other end thereof is connected to terminal support 12 to swing it either in a clockwise or a counterclockwise direction.

It will be noted that the terminal support carries adjustable stops in the form of screws 50 and 51, which respectively move contact springs 41 and 52 out of engagement with their related springs when the terminal support has been rocked to its extreme left or extreme right hand position, thereby interrupting the respective operating circuits (herein later described) of the motor 19 to stop the movement of the support.

The frame 5 also supports an electric motor 27 which through the worm gear and gear drive generally designated 28, continuously rotates the adjustable cam 29. It will be noted that this cam includes a sector 29a which may be adjusted with respect to the main body of the cam to vary the length of the depression 29b in the periphery thereof. A roller 31 engaging the periphery of the cam 29 actuates the movable springs of a spring assembly 32 which is mounted on an extension (not shown) of the frame.

The system also includes a motor valve 37 which is connected in pipe 40 to govern the flow therethrough of a medium to maintain at a desired value, the regulated condition to which the bulb 8 is responsive. This motor valve may be of any well-known construction having an electric motor 37a to actuate the valve stem thereof, which motor is herein illustrated as provided with two independent energizing windings through which it may be respectively actuated to open and close the valve.

In general, the operation of the regulating system on any "change" in the controlled condition consists essentially of an initial or first response that is quickly effected, followed by a second response which is accomplished slowly. The first or initial response is not alone sufficient to adjust the valve 37 so that the regulated medium returns to the desired control point, but it is sufficient to make the "deviation" from the control point only a fraction of what it would be if the initial action were absent. The second action or response serves to adjust the valve 37 slowly so that the regulated medium is restored to the exact predetermined control point. The terms "change" and "deviation" as herein employed may be defined as follows: Change is any fluctuation of the control condition from any value to any other value without regard to the normal desired control point. Deviation is the difference between the desired control condition and the actual control condition.

In Fig. 1 the second response is obtained by means of a timing cam 29 and spring assembly contacts 32. It would be practical for this cam to make one revolution in eight seconds and for the interval during which the second response occurs, to be variable from ¼ to 2 seconds. It should be noted that the contacts of spring assembly 32 are in a position to give the initial response at least 75% of the time and on this account the initial action is much more rapid than the second one so that support 12 follows arm 10 very closely and contact 10 will never remain closed against contact 13 or 14 for more than a very short time, such as one minute.

The second response is much slower with the result that contact 16 may remain closed against contacts 17 or 18 as long as thirty minutes. It is important that the valve motor mechanism 37a be capable of giving a full stroke of the valve in thirty to sixty seconds.

In considering the detailed operation of the system let it be assumed that the temperature of the medium to be regulated and to which the bulb is exposed, rises, in which case the free end of the Bourdon coil will move toward the right. The motion of the coil is communicated through the link 9 to the contactor 10, thereby bringing it repeatedly into engagement with the contact 14 on the terminal support 12. If the springs of the contact assembly 32 are in the position shown when the contactor 10 engages the contact 14, a circuit will be completed from one side of the current source, conductor 33, spring contacts 34, conductor 35, contactor 10, contact 14, conductor 90 through the reverse winding of the motor 37a of the motor valve, conductors 38 and 39, to the other side of the current source. Under the control of this circuit the motor 37a operates the valve 37 to effect a decreased flow of regulating medium through the pipe 40. A circuit is also closed simultaneously in parallel with the one just described, from the contact 14, contact spring 52, conductor 91, contact springs 83 of the spring assembly, conductor 94 through the reverse winding of the motor 19, conductors 45 and 39, to the other side of the current source. Under the control of this circuit, the motor 19 operates and through the mentioned train of gears and pinion 24, moves the link 25 thereby causing the terminal support 12 to swing in a clockwise direction, so that contact 16 moves into engagement with contact 18.

In nearly all applications, the temperature change is slow enough so that the support 12 will be operated in the manner just described, to follow this temperature change with the result that the movement of the support in the clockwise direction will be intermittent since this motion of the support will be rapid enough to move the contact 14 repeatedly away from the contact 10. The operations just described above constitute the initial or first response and are interrupted each time that the follower 31 drops into the notch 29b of the cam 29 to reverse the condition of the spring assembly 32 as shown in Fig. 1.

When the follower thus drops down, the control valve will be closed a small amount as long as contacts 16 and 18 are closed due to the movement of the support 12. A circuit will be completed thereby from the current source over conductor 33, contact springs 46, conductor 47, contactor 16, contact spring 18, conductors 95 and 90, reverse winding of the valve motor 37a, conductors 38 and 39, to the other side of the current source. As long as this circuit is completed, the motor 37a further closes the valve 37 until its operating circuit is opened at the contact 46 of the spring assembly 32 by the further rotation of the cam 29. Such second action is necessary in order to bring the temperature back to the exact control point. The first action alone will allow the temperature to remain away from the exact control point to an appreciable extent. For example, if the valve motion needed were 10% of its total travel, the initial deviation might reasonably be 5° F. The initial response would then leave the support 12 located to the right of the position shown with contacts 16 and 18 closed.

If the contactor 10 is still in engagement with the contact 14 when the spring assembly 32 is restored to its condition as shown, after this last-mentioned operation, the previously described circuits for the reverse windings of the motor 19 and the valve motor 37a will be closed again. Motor 19 will further rotate the terminal support 12 clockwise until the contactor 10 disengages the fixed contact 14 or until cam 29 opens the circuit of motor 19 at contacts 34. Simultaneously with the operation of the motor 19, the motor 37a of the valve will be further operated to close the valve by an additional increment. As long as contacts 16 and 18 are closed, the control valve is given a slight closing motion as a result of the closure of the circuit previously described, each time that the follower 31 drops into the slot 29b. When this repeated slight adjustment of the valve starts to return the temperature to normal, contact 10 will close against the contact 13 (to complete a circuit to be described) to cause a slight movement of the support 12 in a counterclockwise direction with a corresponding opening action of the control valve due to the completion of an operating circuit through the contacts 10 and 13. The adjustment of the valve therefore as a result of the completion of a circuit through the contacts 10 and 13, or 10 and 14 continues until the exact control point is reached, that is, when the contact 16 moves away from the contact 18. It should be mentioned that during the latter part of the correction period, contact 10 repeatedly closes against contact 13, while contacts 16 and 18 remain closed.

In order to describe the invention, it has been assumed that the controlled condition or regulated body undergoes a certain change so that it reacts on the controlling mechanism in a certain manner. It is important to understand that the action of the controlling mechanism in actual use is greatly dependent on the character of the operation of the complete regulating system including the controlling mechanism and the body to be regulated since the regulated body reacts to the controlling mechanism and, in turn, the sensitive element of the controlling mechanism reacts to changes in the regulated body.

Let it now be assumed that the temperature of the medium to be regulated as indicated by the bulb 8, drops, in which case the free end of the Bourdon coil is communicated through link 9 to the contactor 10 thereby bringing it into engagement with the contact 13 on the terminal support 12. If the springs of the contact assembly 32 are in the position shown, when the contactor 10 engages the contact 13, a circuit will be completed from one side of the source of current, conductor 33, spring contacts 34, conductor 35, contactor 10, contact 13, conductor 36, winding of the motor 37a of the motor valve, conductors 38 and 39, to the other side of the current source. Under the control of this circuit the motor 37a operates the valve to permit an increased flow of the regulating medium through the conduit 40. A circuit is also closed simultaneously in parallel with the one last described, from the contact 13, contact spring 41, conductor 42, contact springs 43 of the spring assembly, conductor 44, winding of the reversible motor 19, conductors 45 and 39, to the other side of the cource of current. Under the control of this last-mentioned circuit, the motor 19 operates and through the mentioned train of gears and pinion 24, moves the link 25 causing the terminal support 12 to swing clockwise. These operations constituting the first response, are interrupted when the roller 31 of the spring assembly 32 drops into the depression 29b in the periphery of the constantly rotating cam 29 thereby opening contact springs 34 and 43 to interrupt the circuit just described.

Let it be further assumed that the terminal support has been moved counterclockwise in the manner described until the contactor 16 engages contact spring 17 and that this condition exists while the roller 31 is in the depression 29b to reverse the condition of the spring assembly 32. With these conditions existing, a circuit will be completed from the current source, over conductor 33, contact springs 46, now closed, conductor 47, contactor 16, contact spring 17, conductor 36, winding of the valve motor 37a, conductors 38 and 39, to the other side of the current source. Under the control of this circuit the motor 37a further opens valve 37 until the last mentioned valve motor circuit is opened at the contacts 46 of the spring assembly when the roller 31 moves out of depression 29b on the further rotation of the cam 29. If the contactor 10 is still in engagement with the contact 13 when the spring assembly 32 is restored to its condition as shown, after this last-mentioned operation, the previously described circuits for the motor 19 and the valve motor 37a will be again closed. Motor 19, through the mentioned train of gears and link 25 will again continue to rotate terminal support 12 counterclockwise until the contactor 10 disengages the fixed contact 13 or until cam 29 opens the mentioned operating circuit at the spring contacts 43. Also during the time that the motor 19 is operating, the motor 37a of the valve will be further operated in the circuit previously described as extending from conductor 33, contact springs 34, conductor 35, contactor 10, contact 13, conductor 36, motor 37a, conductors 38 and 39, to the other side of the current source.

The detailed operation of adjusting the valve 37 for a drop in temperature, including the first and second response need not be repeated here since they have already been set forth in the description of the operations taking place in response to a rise in temperature.

The adjustment of the sensitivity of the initial response is made by changing the speed with which the motor 19 drives support 12, which adjustment is effected by replacing the gears 21 and 22. The term "sensitivity" as herein used may be defined as the ratio of the movement of the stem of the valve 37 to the movement of the support 12, the sensitivity being high when the ratio is large. The rate of second response is adjusted by changing the length of slot 29b. The sensitivity of the initial action and the rate of the second must be adjusted after installation in order to obtain the best performance of the instrument on any given application. This is done most conveniently and directly by stopping motor 27 and cam 29 in the position shown in Fig. 1, thereby allowing only the initial action to take place. With the instrument in this condition, the speed with which motor 19 drives support 12 should be made as low as possible by changing the driving gears which means that the sensitivity should be as high as possible, or in other words, that the motion of the control valve 37 should be as great as possible for a given motion of support 12. If the motion of support 12 is too slow, or in other words, if the instrument is too sensitive the control will continue to hunt, especially if there is a disturbance of the controlled condition, to start the hunting action. The gear drive should be adjusted to move support 12 as slowly as possible without causing more than a very slight tendency to hunt. On many applications the best control is obtained by allowing a slight hunting tendency such that a disturbance will cause the control to swing back and forth two or three times before settling down to a straight line.

After adjusting the initial action in the above manner, motor 27 should be connected to run in the usual way and bring about the second response. The gap 29b should be made as long as possible without causing the control to hunt when the controlled condition is disturbed.

The above adjustments bring about the best possible control of a given application. The more slowly support 12 moves, or in other words, the more sensitive the initial response the smaller will be the immediate temperature deviation due to a disturbance in the application. The more rapid the second response, or in other words, the longer the gap 29b is made, the more quickly the controlled condition will return to the exact control point.

In the arrangement disclosed in Fig. 1, spring assembly 32 under the control of roller 31 and cam 29, reverses the normal condition of its spring contacts regularly for a period of fixed duration thereby modifying the operation of the valve 37 by a second response to the change in the condition to be regulated. However, there is indicated in Fig. 2 the manner in which the structure of Fig. 1 may be modified to effect a second response operation of the valve 37, the duration of which operation is proportional to the deviation from the predetermined desired temperature. It will be understood that the portions of Fig. 2 indicated in dotted lines are identical with the foregoing arrangement and are repeated for the purpose of giving a proper background for the changed or added elements of this modification. In this modified form of the invention there is mounted on the rear surface of the terminal support 12 as shown in Fig. 1, a plate having its upper edge formed as a V-shaped cam surface 54. A follower pin 55 carried on the bar 56 engages this cam surface, which bar is mounted for swinging movement in a vertical plane on a saddle 57 pivotally mounted at 58 on bracket 59. In order that the bar 56 may have different operating ranges, the bracket 59 is provided with a horizontal slot 60 permitting movement of the bracket toward the right or to the left, in which position it is clamped with bar 56 horizontally by screws 61 which engage the frame (not shown). The main portion of the bar 56 is substantially rigid but the righthand portion thereof as indicated at 62 is formed of flexible material, while at the free end of the flexible portion of the bar there is provided a lug 63. This lug normally engages the rear face of a constantly driven cam disc 64 which is substituted for the cam 29 of Fig. 1. This disc has a depression 65 in the front face thereof having the outline as indicated by the dotted lines in Fig. 2. The left hand edge of this depression is substantially a straight radial line, while the opposite edge thereof is in the form of a curve so shaped that the period during which the projection 63 is in the depression becomes increasingly greater as the projection is swung toward the center of the cam. On the opposite side of the bar 62 from the projection 63, there engages the movable spring mounting 67 a spring assembly similar to that designated 32 in Fig. 1. This mounting, which may be of insulating material, is pivoted at points 68 on a portion of the frame, while a coil spring 69 tensions this mounting toward bar 62. It will be understood that one spring of each of the pairs of spring contacts 34, 43, 83 and 46 are carried by this movable mounting, while the other related spring of each pair is mounted on a fixed support 66 carried by the frame.

The circuits for this modification are identical with those shown in Fig. 1 and the operation of this modification is also identical with that described in connection with Fig. 1 except that as the terminal support 12 is swung either clockwise or counterclockwise from its normal position as shown, the pin 55 on the bar 56 rides up the cam surface 54 to lower the righthand end of the bar 62. It will be appreciated that if the terminal support 12 is moved only a slight distance, the pin 55 of bar 56 will be elevated only a slight amount, whereas if this support is moved a greater distance, the pin 55 will be elevated a corresponding amount with a corresponding lowering of the righthand pin of the bar 56. In other words, this arrangement causes the righthand end of the bar 56 to be lowered an amount proportional to the movement of the terminal support from its normal position. It has been mentioned that the width of the depression 65 increases toward the center of the cam so that the duration of the reversal of the position of the springs of the contact spring assembly and therefore the duration of closure of the spring contacts 46 to effect a second response operation, will be proportional to the movement of the terminal support from its normal position which may be otherwise expressed as proportional to the deviation from the desired temperature in the regulating system.

In adjusting the modified system of Figs. 2, 3 and 4 for any particular installation, the adjustment of the sensitivity of the initial response is also effected as in the arrangement of Fig. 1 by changing the speed at which the motor 20 drives the support 12. This change in speed is effected by changing the ratio of gears 21 and 22. The rate of the second response, however, is changed in this arrangement by moving the pivot 58 by means of the adjusting screws 61 and the slot 60.

Since the arrangement disclosed in Fig. 5 is quite similar to that already set forth in the arrangements of Figs. 1 and 2, its operation will be only briefly described. It should be understood that this arrangement differs from those already described in that the second response results partially from slight additional movements of the support 12 in a direction opposite to the deviation each time the roller 31 of the spring assembly drops into the depression of the cam. At the same time the valve 37 will be operated slightly in its original direction of movement. Unless the temperature deviation is decreasing, as soon as the cam depression is passed the support 12 will be returned in the direction of the deviation with a corresponding valve movement in the original direction. Let it be assumed that the temperature about the bulb 8 in Fig. 5 rises, in which case the Bourdon spring 6 will tend to unwind with the result that the movable contact 10 will swing about its pivot 11 into engagement with the contact 14. With the spring assembly 32 in the position shown, this results in the closing of the operating circuits for valve motor 37a and the motor 19, which circuits are completed from one side of the alternating current source over conductor 70, contacts 71 of the spring assembly, conductor 72, contactor 10, contact 14 where the circuit divides, one branch extending through the conductor 75, winding of the motor 37a, conductors 76a and 76, to the other side of the alternating current source. The other branch of this circuit is simultaneously closed in multiple with that just described, from the contactor 10, contact 14, contacts 52 of the limit switch, conductor 74, spring contact 74a, conductor 77, winding of the motor 19, conductor 76, to the other side of the alternating current source. As a result of the closure of these last two mentioned circuits the valve motor 37a operates to close the valve 37 and the motor 19 operates through the previously mentioned train of gears and the link 25 to rotate the support 12 in a clockwise direction. The movement of the valve and the support continue until the roller 31 of the contact spring assembly 32 drops into the depression 29b of the continuously rotating cam 29 driven by the motor 27 or until contacts 10 and 14 open. The operation of the valve and the support just described constitute either the whole or a part of the first response of the regulating system. When, however, the roller 31 drops into the depression 29b in the mentioned cam, the condition of the spring assembly as shown is reversed. If at this time the contactor 16 on the support has been moved into engagement with the contact 18, the motor 19 will be operated to rotate the support 12 a short distance in a counterclockwise direction and the valve motor 37a will also be operated at this time to decrease the valve opening. The operating circuit for the motor 19 at this time may be traced from one side of the alternating current source, conductor 70, contact springs 78, conductor 79, contactor 16, contact spring 18, contacts 52 of the limit switch, conductors 74 and 80, contact springs 81, conductor 82, winding of the motor 19, conductor 76 to the other side of the alternating current source. However, the valve motor 37a will be operated in a circuit traceable from one side of the alternating current source, conductors 70, contact 78, conductor 79, contactor 16, contact spring 18, conductor 75, winding of the valve motor, conductors 76a and 76 to the other side of the current source. In this manner the second response results by reason of slight additional movements of the support 12 in a counterclockwise direction, that is, in a direction opposite to the deviation, and in small additional movements of the valve 37 in the same direction as that required by the deviation of the controlled condition so that each time that the roller 31 rotates on the low part of the constantly rotating cam 29b, the previously mentioned circuits for the motor 37a and the motor 19 effect a slight additional closing of the valve 37 and also a restoration of the support 12 to its former position by a clockwise movement. The operations just described continue until the contactor 16 is out of engagement with the spring contact 18 and until the contactor 10 is out of engagement both with the contact 13 and the contact 14. A drop in temperature about the bulb 8 results in similar operations to those just described, but in the opposite sense.

The method of adjusting the system of Fig. 5 may be similar to the method of adjusting the system of Fig. 1 previously described.

In the modified form of the invention shown in Fig. 6, the mechanical structure thereof is similar to that shown in Fig. 1, that is, the valve 37 and the support 12, in effecting the first response, move relatively fast in the direction corresponding to the deviation from the desired condition, but the second response is brought about by slowly moving the support 12 in the reverse direction. In this arrangement the gear 23 which operates the spur gear 24 to move the link 25 either toward the right or to the left, is driven by a differential gear unit 85. This unit is adapted to rotate on the shaft 86 which is attached to the gear 23 and also on the shaft 87 of the spur gear 22. The shafts 86 and 87 which are colinear, have attached thereto the bevel gears 88 and 89. These gears mesh with the bevel gears 90 and 91 mounted on stub shafts 92 and 93 which are both freely rotatable in the wall of the unit 85. This unit is provided on its periphery with ring gear teeth 94 meshing with the teeth of gear 95 of a train of gears generally designated 96. This gear train is driven by the worm gear 99 which meshes with the worm 100 on the shaft of the motor 101. It should be mentioned that motor 101 is connected through the gear train to the support 12 so that it drives this support more slowly than the motor 19.

Briefly, the operation of this arrangement is as follows: If, for example, the temperature in the medium about the bulb 8 rises, the Bourdon spring tends to unwind and through link 9 swings the contactor 10 into engagement with the contact 14. The engagement of these contacts completes a circuit from one side of the alternating current source, over conductor 102, contactor 10 now in engagement with contactor 14 on the support 12, conductor 105, winding of the motor valve 37a, conductor 104 to the alternating current source. At this same time and in multiple with the last described circuit, a circuit is completed for the motor 19, this circuit extending from contactor 10, contact 14, through the contacts of the limit switch 52, conductor 103, winding of the motor 19, conductors 104b and 104, to the other side of the alternating current source, the remainder of this circuit being as previously described. The motor 19 when energized in the manner just described, operates through the worm gear 20 and through the gears 21 and 22 to drive the bevel gear 89. This gear operates through the bevel gears 90 and 91 to drive the bevel gear 88. It will be understood that the differential gear unit 85 remains stationary since the motor 101 is inactive at the time. Gear 88 with the shaft 86 drives the gear 23 which, in turn, meshes with the gear 24 to move the link 25 toward the right and thereby move the support 12 clockwise causing the contactor 16 to engage the contact 18, the motor 19 being a fast motor operates to drive support 12 clockwise until contactor 10 disengages contact 14. When this takes place the motor 101 is energized in a circuit from one side of the alternating current source, conductors 104 and 104a, winding of the motor 101, conductor 106, contact 18, contactor 16, thence to the conductor 102 leading to the other side of the alternating current source. The motor 101 operating through the worm 100 and the gear 99 drives the gear train 96 including the gear 95 and the ring gear teeth 94 on the differential unit 85 to rotate the same, and thereby reduce the clockwise movement of the support 12 by rotating the case of unit 85 in the same direction that gear 89 has rotated. The movement of the valve 37 and the support 12 continues until the contactors 10 and 16 are out of engagement with their related contacts, a condition which exists when the temperature of the medium about the bulb 8 is at the predetermined value. A drop in temperature at the bulb 8 results in similar control operations as previously described, but in the opposite sense.

In the modified arrangement shown in Fig. 7, instead of employing the differential control unit 85 to effect rotation of the support 12 as in Fig. 6, a similar unit is used in connection with the valve motor 37a for operating motor valve 37. The operation of this modification is similar to that of the form of the inventon shown in Figs. 1 to 4, except that the movement of the valve due to the second response, instead of being interrupted, may be a slow continuous movement in its original direction until the control condition is restored to normal. The speed of the valve travel is the sum of the individual speeds due to the first and second response until the first response is finished, at which time the valve continues to move at a rate governed by the second response.

In this arrangement the valve stem extension 37b is threaded to make threaded engagement with the gear 110 at the axis thereof, so that as the gear rotates, the position of the valve disc of the valve 37 is changed. This gear meshes with a pinion 111 which is mounted on the shaft 112 supported in the differential gear unit, shaft 112 terminating in the bevel gear 88. This gear meshes with the bevel gears 90 and 91 which, in turn, mesh with the bevel gear 89. The shaft of this last-mentioned bevel gear is coaxial with shaft 112 and is driven by the worm gear 142 which is actuated by the worm 113 on the shaft of the motor 114. The gear 115 formed integral with the exterior of the differential gear unit 85, meshes with a gear 116 which, in turn, is driven by the worm and gear 125 from the motor 130.

Briefly, the operation of this arrangement is as follows: If, for example, the temperature of the medium about the bulb rises, the Bourdon spring 6 unwinds and through the action of link 9 rotates the contactor 10 in a clockwise manner into engagement with contact 14. This is effective to close a circuit from the alternating current source, conductors 118 and 118a, contactor 10, contact 14, contacts of the limit switch 52, conductor 119, winding of the motor 19, conductor 120, to the other side of the alternating current source. Under the control of this circuit the motor 19 operates through the train of gears previously mentioned and in a manner already described to cause the link 25 to rotate the support 12 in a clockwise direction. Simultaneously with the closure of this circuit and in multiple therewith, a circuit is extended from the contact 14 through conductor 121, winding of the motor 114, conductor 120, to the other side of the alternating current source. Thus on the closures of these circuits in addition to the movement of the support 12 in a clockwise direction, the motor 114 operating through the worm gear and the differential unit 85, rotates the pinion 111 and, in turn, the gear 110. This gear by reason of its screw-threaded engagement with the valve stem 37b tends to close the valve. As soon as the support 12 is moved to the point where the contactor 16 thereon is in engagement with the contact spring 18, a circuit is closed for operating the motor 130 which is effective to actuate the valve stem slowly in the direction already mentioned, namely, in a closing direction. This circuit for the motor 130 may be traced from one side of the alternating current source, conductor 118, contactor 16, contact spring 18, conductor 122, winding of the motor 130, thence over conductor 120 to the other side of the alternating current source. It should be mentioned that the gear ratio of the gears interposed between the motor 114 and the valve stem 37b is such as to have a much greater effect in the actuation of valve 37 than does motor 130. In this arrangement the valve will continue to operate until the contactors 10 and 16 are out of engagement with their respective contacts and the temperature is normal. The method of operation when the temperature falls, instead of rises, will be obvious from the foregoing description.

All of the arrangements presented in Figs. 1 to 7 have the characteristic that when a deviation occurs, there is an immediate "first response" that changes the valve position an amount proportional to the deviation. In all cases a deviation causes a slow or "second response" that may be at a constant rate or the rate may be proportional to the deviation. During the time that the temperature is gradually returning to normal, the "second response" causes the valve to slowly change position in the original direction. An important characteristic of the arrangements disclosed is that during this time the support 12 returns to its normal position and in doing so, a valve motion results, that is, in the direction opposite to the original motion. Therefore during the final period when the temperature is returning to normal, the actual valve motion is the difference between two motions in opposite directions. Should the temperature approach normal too rapidly so as to "overthrow" the normal point, the actual valve motion produced will slow down the approach.

A further important characteristic of the arrangements disclosed is the method of operation when the apparatus is started after a period of idleness. This may be explained by assuming that the normal control temperature is an elevated temperature and that during the idle period the temperature is far below the normal value. During the idle period the arrangements shown will move the support 12 counterclockwise until contact 41 is opened and the control valve will be opened to the limit. These conditions will exist when the apparatus is again placed in operation and the important feature is that as the temperature approaches the normal control value, at a definite point below that value, as determined by adjustable screw 50, contactor 10 will close against contact 14, causing the support 12 to rotate clockwise in accordance with the temperature increase and the valve 37 to close a proportionate amount. From the time the control starts acting, as evidenced by contactor 10 touching contact 14, until the normal control temperature is reached, the control mechanism functions to bring the apparatus to the control temperature as rapidly as possible and without passing beyond or "overthrowing" the control point to a serious extent. The action is the same as that described in the preceding paragraph, for as the control temperature is approached the valve may be moved in either direction as needed. This performance is dependent upon proper adjustment as previously described, of the first response sensitivity and of the second response rate. A further adjustment that affects this particular feature is the adjustable screw 50 (or 51) as it determines the temperature at which the control starts acting. The difference between the control temperature and temperature at which the control mechanism starts acting may be referred to as the "operating range".

I claim:

1. In a system of the class described, a regulating element, reversible electric driving mechanism for the same, a primary pair of spaced contacts, a primary contactor cooperating therewith, a second pair of spaced contacts, a secondary contactor cooperating therewith, mechanism responsive to changes in the condition to be regulated for moving said primary contactor relative to the primary contacts, primary means operative responsive to the closure of said primary contactor and primary contacts to move them apart and to cause simultaneous motion of the secondary contactor relative to the secondary contacts and operation of the reversible driving mechanism, and secondary means including a part of said primary means operative responsive to the closure of the secondary contactor and secondary contacts to effect operation of the reversible driving mechanism.

2. In a system of the class described, a regulating element, reversible electric driving mechanism for the same, a primary pair of spaced contacts, a primary contactor cooperating therewith, a second pair of spaced contacts, a secondary contactor cooperating therewith, mechanism responsive to changes in the condition to be regulated for moving said primary contactor relative to the primary contacts, primary means operative responsive to the closure of said primary contactor and primary contacts to move them apart and to cause simultaneous motion of the secondary contactor relative to the secondary contacts and operation of the reversible driving mechanism, and secondary means operative responsive to the closure of the secondary contactor and secondary contacts to effect operation of the reversible driving mechanism.

3. In a system of the class described, a regulating element, reversible electric driving mechanism for the same, a primary pair of spaced contacts, a primary contactor cooperating therewith, a second pair of spaced contacts, a secondary contactor cooperating therewith, a third contact and third contactor cooperating therewith, mechanism responsive to changes in the condition to be regulated for moving said primary contactor relative to the primary contacts, primary means operative responsive to the simultaneous closure of both said primary contactor and primary contacts and said third contact and third contactor to move the primary contactor and primary contacts apart and to cause simultaneous motion of the secondary contactor relative to the secondary contacts and operation of the reversible driving mechanism, and secondary means including a part of said primary means operative responsive to the closure of the secondary contactor and secondary contacts to effect operation of the reversible driving mechanism.

4. In a system of the class described, a regulating element, reversible electric driving mechanism for the same, a primary pair of spaced contacts, a primary contactor cooperating therewith, a second pair of spaced contacts, a secondary contactor cooperating therewith, a third contact and third contactor cooperating therewith, mechanism responsive to changes in the condition to be regulated for moving said primary contactor relative to the primary contacts, primary means operative responsive to the simultaneous closure of both said primary contactor and primary contacts and said third contacts and third contactor to move the primary contactor and primary contacts apart and to cause simultaneous motion of the secondary contactor relative to the secondary contacts and operation of the reversible driving mechanism, and secondary means operative responsive to the closure of the secondary contactor and secondary contacts to effect operation of the reversible driving mechanism.

5. In a system of the class described, a regulating element, reversible electric driving mechanism for the same, a primary contact, a primary contactor cooperating therewith, a second contact, a second contactor cooperating therewith, mechanism responsive to changes in the condition to be regulated for moving said primary contactor relative to the primary contact, primary means operative responsive to the closure of said primary contactor and primary contact to move them apart and to cause simultaneous motion of the second contactor relative to the second contact and operation of the reversible driving mechanism, and secondary means including a part of said primary means operative responsive to the closure of the second contactor and second contact to effect operation of the reversible driving mechanism.

6. In a system of the class described, a regulating element and a reversible motor for operating the same, a pair of spaced contacts, a contactor movable into engagement with either of said contacts, circuits for said motor respectively completed by engagement of said contactor with said contacts, mechanism responsive to a change in a condition to be regulated for moving said contactor into engagement with one of said contacts whereby a circuit is closed for operating said motor in one direction to actuate said element, means also controlled by the engagement of said contactor and said last-mentioned contact for changing the relation between said contactor and the mentioned contact with which it is in engagement, supplemental contacts actuated by said means, and a circuit controlled by said supplemental contacts for operating said motor to continue the movement of said element in the direction last mentioned.

7. In a system of the class described, a regulating element and a primary motor for operating the same, a movable support provided with a pair of spaced contacts, a contactor movable into engagement with either of said contacts, mechanism responsive to a deviation from the condition to be regulated for causing engagement of said contactor with one of said contacts, a supplemental contact mounted on said support, other contacts in operative relation to said supplemental contact, means including a second motor for moving said support, circuits for said motors completed by the engagement of said first contactor with one of said contacts whereby said element is actuated and whereby said support is moved in a direction to effect engagement between said supplemental contact and one of said other contacts, a supplemental circuit for said first motor completed through said supplemental contact and one of said other contacts, and means including a timing device for alternatively closing and opening the circuits of said primary motor.

8. In a system of the class described, a regulating element and a primary reversible motor for operating the same, a movable support provided with a pair of spaced contacts, a contactor movable into engagement with either of said contacts, mechanism responsive to a deviation from the condition to be regulated for moving said contactor into engagement with one of said contacts, a supplemental contact mounted on said support, other contacts in operative relation to said supplemental contact, means including a second motor for moving said support, circuits for said motors completed by the engagement of said contactor with one of said first contacts whereby said element is actuated and whereby said support is moved in a direction to bring said supplemental contact into engagement with one of said other contacts, a supplemental circuit for said primary motor completed through said supplemental contact with said last-mentioned contact, and means including a timing device for closing said supplemental circuit for periods of durations proportional to the movement of said contactor.

9. In a system of the class described, a regulating element and a motor for operating the same, a movable support provided with a pair of spaced contacts and with a supplemental contactor, a contactor movable into engagement with either of said contacts, a pair of supplemental contacts in the path of movement of said supplemental contactor, mechanism responsive to a deviation from the condition to be regulated for moving said contactor into closed relation with one of said contacts, a circuit for said motor completed by said closure of said contactor and contact means including a pair of motors jointly operating to rotate said support, a circuit in multiple with a portion of said first-mentioned circuit for actuating one of the motors of said pair, and a circuit for the other motor of the pair completed by the closure of said supplemental contactor with one of said supplemental contacts.

10. In a system of the class described, a regulating element, means including a pair of motors jointly cooperating to actuate said element, a movable support provided with a pair of spaced contacts, a contactor movable into engagement with either of said contacts, a supplemental contactor carried by said support, spaced supplemental contacts in operative relation to said supplemental contactor, mechanism responsive to a deviation from the condition to be regulated for effecting the closure of said contactor with one of said contacts, a third motor for operating said support, a circuit for said third motor completed by the closure of said contactor and contact, and circuits for said first-mentioned pair of motors respectively controlled by the engagement of said contactor with one of said contacts and by engagement of the supplemental contactor with one of said supplemental contacts.

KARL H. HUBBARD.